US012683878B2

(12) United States Patent (10) Patent No.: US 12,683,878 B2
Raghavan et al. (45) Date of Patent: Jul. 14, 2026

(54) SYSTEM AND METHOD FOR ROGUE USER PLANE DETECTION

(71) Applicant: RAKUTEN MOBILE, INC., Tokyo (JP)

(72) Inventors: Sathyadeep Raghavan, Tokyo (JP); Prateek Khanna, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 768 days.

(21) Appl. No.: 17/917,159

(22) PCT Filed: Jan. 21, 2022

(86) PCT No.: PCT/US2022/013251
§ 371 (c)(1),
(2) Date: Oct. 5, 2022

(87) PCT Pub. No.: WO2023/140857
PCT Pub. Date: Jul. 27, 2023

(65) Prior Publication Data
US 2024/0223477 A1 Jul. 4, 2024

(51) Int. Cl.
*H04L 43/062* (2022.01)
*H04L 43/10* (2022.01)
(52) U.S. Cl.
CPC ............ *H04L 43/062* (2013.01); *H04L 43/10* (2013.01)
(58) Field of Classification Search
CPC ....... H04L 43/062; H04L 43/10; H04L 43/16; H04W 24/04
See application file for complete search history.

(56) References Cited

U.S. PATENT DOCUMENTS

| | | | | |
|---|---|---|---|---|
| 11,489,769 | B2 * | 11/2022 | Suthar | H04L 45/66 |
| 2016/0080238 | A1 * | 3/2016 | Bar-Yanai | H04L 1/20 709/224 |
| 2017/0070781 | A1 * | 3/2017 | Bar Yanai | H04N 21/44008 |
| 2019/0230060 | A1 * | 7/2019 | Yin | H04L 61/5061 |
| 2019/0253930 | A1 * | 8/2019 | Senju | H04W 88/16 |
| 2020/0221521 | A1 * | 7/2020 | Cui | H04W 76/15 |
| 2020/0304408 | A1 * | 9/2020 | Suthar | H04L 67/141 |
| 2021/0045091 | A1 * | 2/2021 | Arora | H04W 16/04 |
| 2021/0232409 | A1 * | 7/2021 | Vetter | G06F 9/451 |

(Continued)

FOREIGN PATENT DOCUMENTS

| | | | | | |
|---|---|---|---|---|---|
| CN | 103974436 | A | * | 8/2014 | |
| EP | 4250803 | A1 | * | 9/2023 | H04W 24/02 |

(Continued)

OTHER PUBLICATIONS

International Search Report for PCT/US2022/013251 dated May 3, 2022 [PCT/ISA/210].

*Primary Examiner* — Michael A Keller
(74) *Attorney, Agent, or Firm* — Sughrue Mion, PLLC

(57) ABSTRACT

A method is provided. The method includes monitoring, by a virtualized central unit (VCU), data traffic on a first user plane, detecting, by the VCU, a data traffic inconsistency on the first user plane, and providing, by the VCU, a notification of the data traffic inconsistency to an external device based on the detecting the data traffic inconsistency. The VCU resumes monitoring data traffic on the first user plane based on an indication from the external device that the data traffic inconsistency is resolved.

20 Claims, 7 Drawing Sheets

(56)  References Cited

U.S. PATENT DOCUMENTS

| | | | | |
|---|---|---|---|---|
| 2024/0223477 A1 * | 7/2024 | Raghavan | ............... | H04L 43/10 |
| 2025/0106732 A1 * | 3/2025 | Niemelä | ................... | H02J 3/32 |
| 2025/0133491 A1 * | 4/2025 | Simlai | ................... | G06N 20/00 |
| 2025/0240658 A1 * | 7/2025 | Pantelidou | ............. | H04L 41/16 |

FOREIGN PATENT DOCUMENTS

| | | | | |
|---|---|---|---|---|
| WO | 2021/185452 A1 | 9/2021 | | |
| WO | WO-2022189701 A1 * | 9/2022 | ........ | H04W 36/0072 |
| WO | WO-2022238976 A1 * | 11/2022 | ............. | G06F 8/65 |
| WO | WO-2023140857 A1 * | 7/2023 | ............ | H04L 43/10 |

* cited by examiner

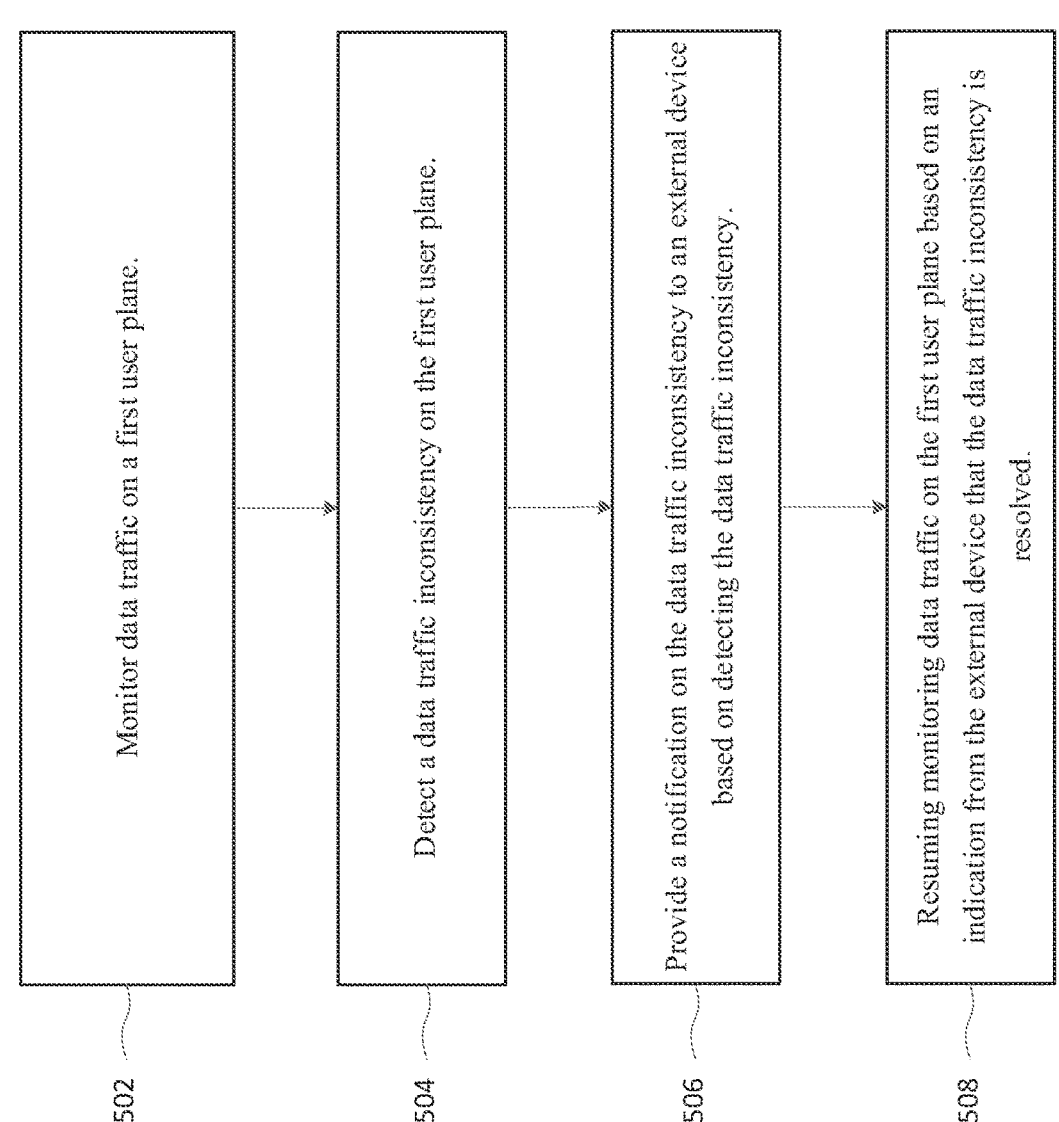

500

502  Monitor data traffic on a first user plane.

504  Detect a data traffic inconsistency on the first user plane.

506  Provide a notification on the data traffic inconsistency to an external device based on detecting the data traffic inconsistency.

508  Resuming monitoring data traffic on the first user plane based on an indication from the external device that the data traffic inconsistency is resolved.

FIG. 5

SYSTEM AND METHOD FOR ROGUE USER PLANE DETECTION

CROSS REFERENCE TO RELATED APPLICATIONS

This application is a National Stage of International Application No. PCT/US2022/013251 filed Jan. 21, 2022.

BACKGROUND

1. Field

The disclosure relates to a system and method for detecting a rogue user plane.

2. Description of Related Art

In a new radio (NR) network, there may be at least two available user planes (UPs) which are used to send UP data (e.g., network user traffic). It is possible that either of the UPs fail to schedule packets for specific user equipment (UE) that are attached to the UP, which leads to a poor user experience. Namely, data packets scheduled for transmission on the failed UP (e.g., a UP in a sleep or idle state) will not be forwarded to their destination nodes, leading to no data flow at the UE attached to the failed UP.

SUMMARY

One or more example embodiments provide a system and method that mitigate the occurrence of user plane (UP) scheduling failures and generate notifications such that required actions are taken to resolve scheduling failures.

In accordance with an aspect of the disclosure, a method may include monitoring, by a virtualized central unit (VCU), data traffic on a first user plane, detecting, by the VCU, a data traffic inconsistency on the first user plane, and providing, by the VCU, a notification of the data traffic inconsistency to an external device based on the detecting the data traffic inconsistency. The VCU may resume monitoring data traffic on the first user plane based on an indication from the external device that the data traffic inconsistency is resolved.

In accordance with an aspect of the disclosure, a system may include a memory storing instructions and a processor configured to execute the instructions to monitor, by a VCU, data traffic on a first user plane, detect, by the VCU, a data traffic inconsistency on the first user plane, and provide, by the VCU, a notification of the data traffic inconsistency to an external device based on the detecting the data traffic inconsistency. The VCU may resume monitoring data traffic on the first user plane based on an indication from the external device that the data traffic inconsistency is resolved.

In accordance with an aspect of the disclosure, a non-transitory computer-readable storage medium may store instructions that, when executed by one or more processors, cause the at least one or more processors to monitor, by a VCU, data traffic on a first user plane, detect, by the VCU, a data traffic inconsistency on the first user plane, and provide, by the VCU, a notification of the data traffic inconsistency to an external device based on the detecting the data traffic inconsistency. The VCU may resume monitoring data traffic on the first user plane based on an indication from the external device that the data traffic inconsistency is resolved.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 5 is a flowchart for a method of monitoring a UP, according to an embodiment;

DETAILED DESCRIPTION

The following detailed description of example embodiments refers to the accompanying drawings. The same reference numbers in different drawings may identify the same or similar elements.

Figure 1:
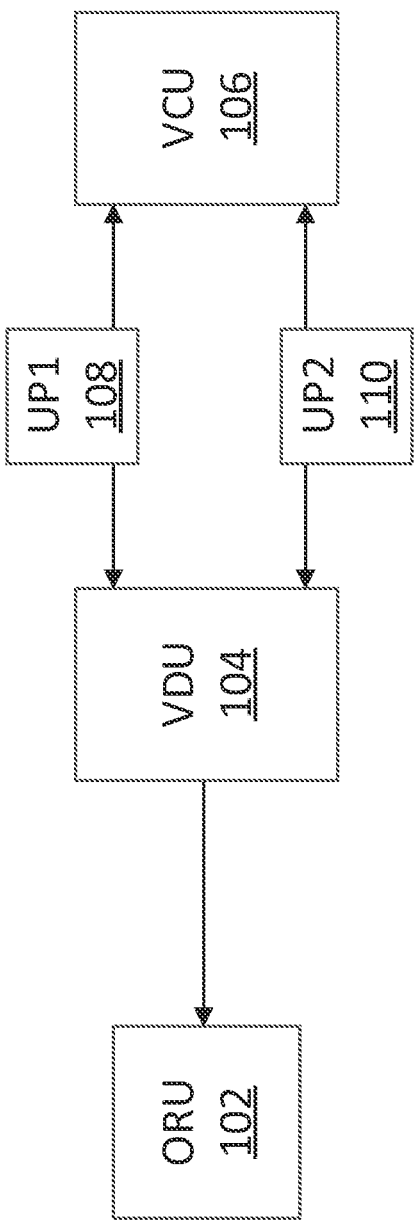
FIG. 1 is a block diagram of a communication system with multiple user planes (UPs)

FIG. 1 is a block diagram of a communication system with multiple user planes (UPs). The system includes a radio unit, such as an Open Radio Access Network (O-RAN) Radio Unit (ORU) 102, a virtualized distributed unit (VDU) 104, a virtualized central unit (VCU) 106, a first UP 108 and a second UP 110 that establish respective communication links between the VDU 104 and the VCU 106. The two UPs 108 and 110 may be connected from the VCU 106 to an upper layer of the VDU 104. Thus, when a user equipment (UE) (e.g., the ORU 102) connects to the network, data packets may be transmitted from the VCU 106, to one of the UPs, to the upper layer of the VDU 104 and to the ORU 102. The flow of the data packets may be bi-directional, such that both the uplink traffic and the downlink traffic is carried by the UPs 108 and 110.

In some scenarios, the UP carrying the data packets (i.e., UP 110) may transition to a "sleep" state (i.e., a state in which the link between the VCU 106 and the VDU 104 is active and reachable when pinging for either side, but the packets scheduled on that link are not forwarded to the destination node), and this may lead to the data packets not being transmitted, resulting in no data flow to and from the UE. The system shown in FIG. 1 does not provide any mechanism to efficiently detect or identify that a UP has transitioned into a sleep state or idle state, leading to the data packets being scheduled in the sleep state UP and causing unsuccessful transmission of the scheduled data packets.

In a new radio (NR) network, the VCU 106 includes a minimum of two UPs in the network and data is sent across both UPs while being sent to UEs attached to the network. Thus, provided herein are a system and method to monitor the data traffic and provide notifications of data traffic inconsistencies based on a communication failure state (e.g., a sleep or an idle state) of a UP. The notifications may be provided to an external device that determines whether a recovery action needs to be taken. The provided system and method may reduce the number of UP schedulings that go unfulfilled, which may enable faster resolution of scheduling issues.

Figure 2:
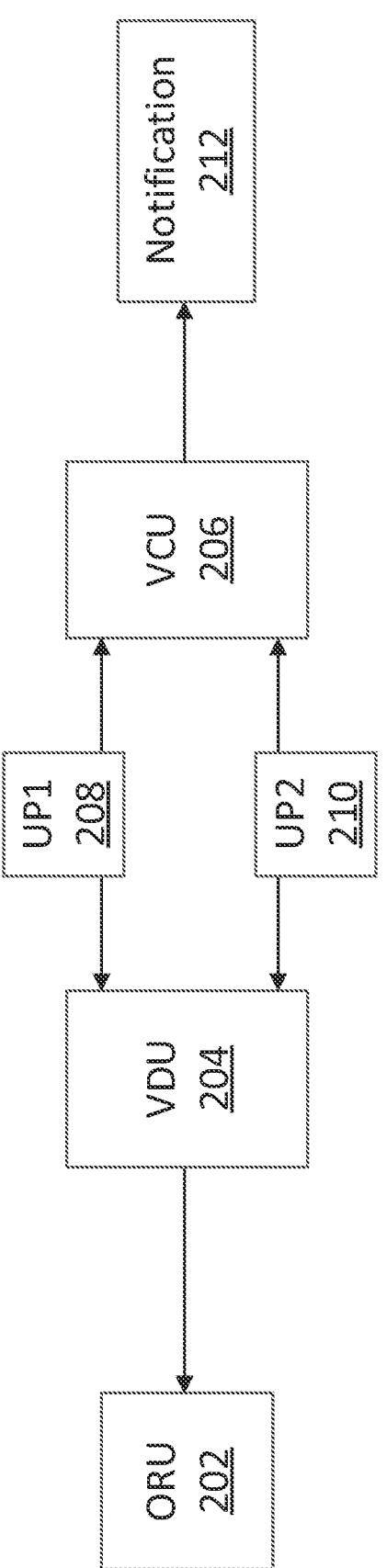
FIG. 2 is a block diagram of a communication system with multiple UPs, according to an embodiment.

FIG. 2 is a diagram of a system with multiple UPs, according to an embodiment. The system may include an ORU 202, a VDU 204, a VCU 206, a first UP 208 commudetermine whether the data traffic inconsistency on the monitored UP requires correction. The notification may be in the form of an electronic mail or other communication including various regarding the data traffic inconsistency. Table 1 is an example of information included in the notification 212.

TABLE 1

| ALARM_TIME | SERVING CGI 5G | Impacted UP IP Address | Impacted Users | Previous Hour Count (Impacted User) | Total Data Volume from Impacted UP |
|---|---|---|---|---|---|
| Average Data Volume for Last 3 hrs for Impacted UP | Average Data Volume for Last 6 hrs for Impacted UP | Total Data Volume in unimpacted UP in Current Hour | Average Data Volume for Last 6 hrs in unimpacted UP | Severity | Is VIP Impacted | nicably linking the VDU 204 and the VCU 206, and a second UP 210 communicably linking the VDU 204 and the VCU 206. The VCU 206 is configured to output a notification 212 based on monitoring data traffic on the UPs 208 and 210 and detecting a data traffic inconsistency on one of the UPs, as is described below.

The VCU 206 may be configured to monitor the first UP 208 and the second UP 210 to determine a UP among the first UP 208 and the second UP 210 that has the lesser amount of traffic. The VCU 206 may be configured to determine or detect a data traffic inconsistency on the monitored UP based a predetermined traffic threshold. For example, based on an amount of data traffic on the monitored UP being less than or equal to the predetermined traffic threshold, the VCU 206 may determine that the monitored UP has a data traffic inconsistency, and then may generate the notification 212 based on the data traffic inconsistency. In some embodiments, the predetermined traffic threshold may be based on a ratio of an amount of data traffic on the monitored UP and an amount of user traffic on the monitored UP. Based on the ratio of data traffic to user traffic being less than or equal to a ratio threshold, the VCU 206 may determine that there is a data traffic inconsistency. The VCU 206 may also be configured to check data traffic and user traffic at predetermined time intervals.

The VCU 206 may determine a data traffic inconsistency based on a number of users on the monitored UP (e.g., number of UE attached to the monitored UP) and the data traffic volume on the monitored UP. The VCU 206 may further determine whether users are active on the monitored UP, and determine a data traffic inconsistency based on the active user determination. For example, the system (e.g., the VCU 206) may include an active users counter indicative of a number of active users (or UE) transmitting and/or receiving data on the user plane, and a connected users counter indicative of a number of connected users (or UE) connected on the user plane but not using any data. In some embodiments, when a number of "connected" users is greater than a number of "active" users on the monitored UP, this may be an indication of data flow interruption. Thus, the system may determine a data traffic inconsistency. In some embodiments, the VCU 206 may maintain a history of user functions, such that when the user requests data packets, the VCU 206 may track the user as active.

The notification 212 may be transmitted to an external unit or monitoring user (e.g., network administrator) to As shown in Table 1, the notification 212 may provide the alarm time, the serving 5G cell serving identity (CGI), the IP address of the impacted UP, a list of impacted users, a previous hour count of impacted users (i.e., a count of impacted users in a previous hour or other time period), a total data volume from the impacted UP, an average data volume for the previous 3 hours (or any other time interval) of the impacted UP, an average data volume for the previous 6 hours (or any other time interval) of the impacted UP, a total data volume in an unimpacted UP in the current hour (or any other time period), an average data volume for the previous 6 hours (or any other time interval) in the unimpacted UP, an indication of the severity, and a determination as to whether a very important person (VIP) or specific client is impacted by the data traffic inconsistency. It will be understood by those of skill in the art that other, more, or less information may be included in the notification 212.

Figure 3:
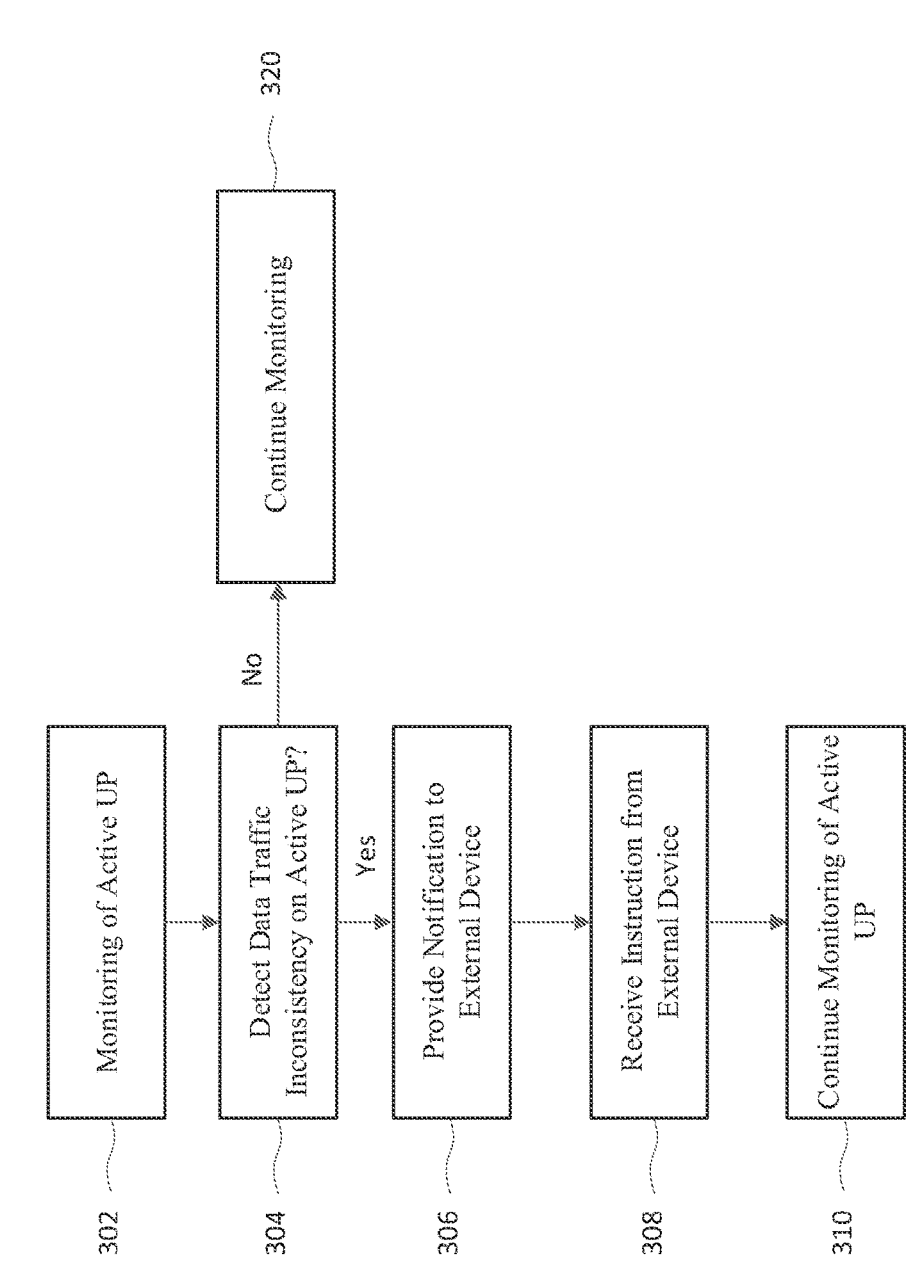
FIG. 3 is a flowchart of a method for monitoring a UP, according to an embodiment.

FIG. 3 is a flowchart 300 of a method for monitoring a UP, according to an embodiment. The method of FIG. 3 may be performed by the VCU 206 shown in FIG. 2. Referring to FIG. 3, in operation 302, the system may monitor one or more UPs. In operation 304, the system determines whether a data traffic inconsistency on the UP is detected. If no data traffic inconsistency is detected, in operation 320, the system may continue monitoring the one or more UPs. Based on a data traffic inconsistency being detected, in operation 306, the system provides a notification to the external device. The notification may include data and user information as described above with respect to Table 1. In operation 308, the system receives an instruction from the external device. The instruction may include an indication that there is no action that is required to be taken, or that an action has been taken. In operation 310, the system may continue to monitor the active UP.

Figure 4:
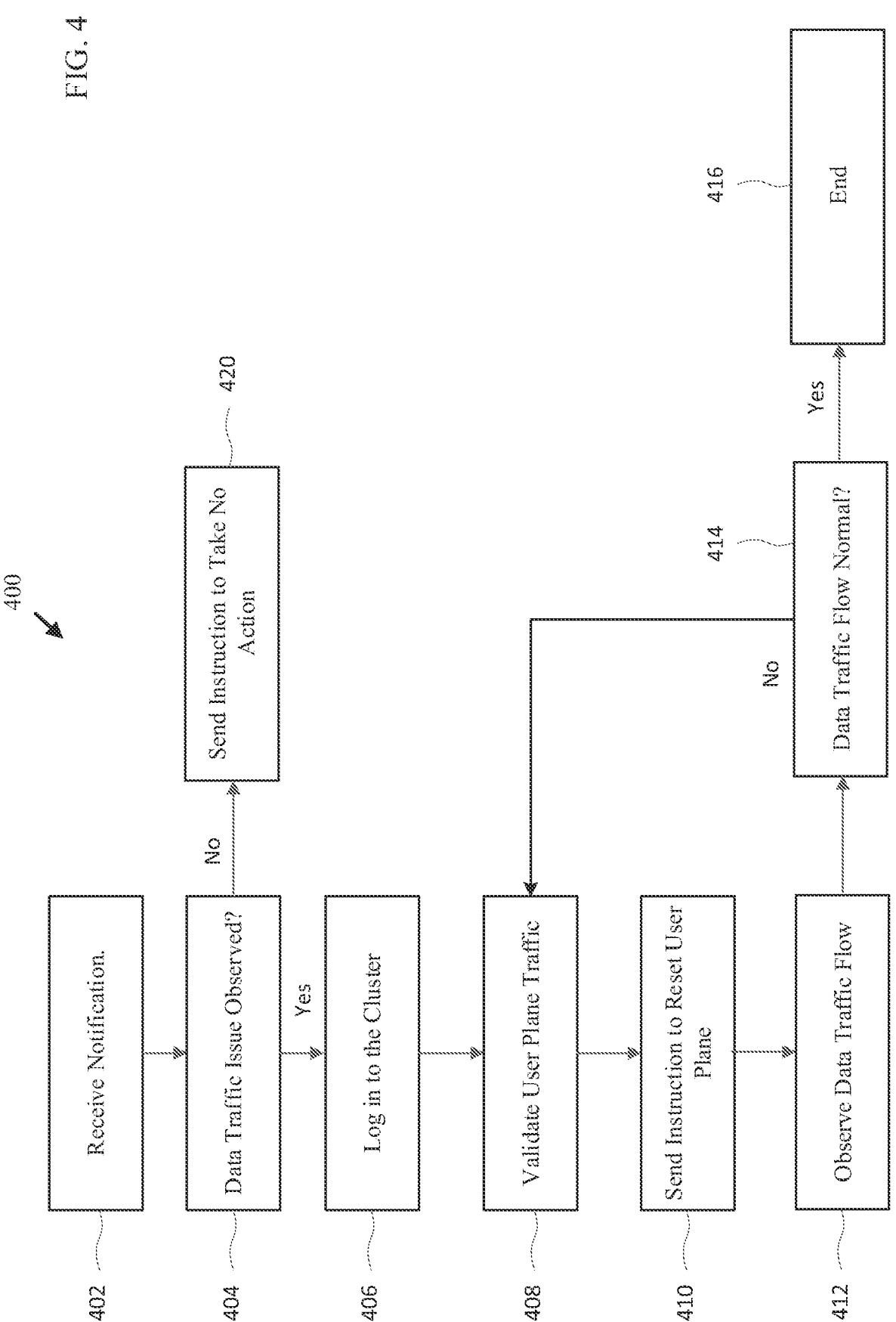
FIG. 4 is a flowchart of a recovery process, according to an embodiment.

FIG. 4 is a flowchart 400 of a recovery process, according to an embodiment. The recovery process may be performed by a system that is external to the network that includes the UPs. For example, the recovery process may be performed by a user of the external system. In some embodiments, the recovery process is performed based on a neural network (NN) or machine learning model trained or configured to identify whether a recovery action needs to be taken based on information included in the notification.

Referring to FIG. 4, in operation 402, the system receives a notification (e.g., notification 212). In operation 404, the system determines whether a data traffic issue is observed based on information in the notification. If no data traffic issue is observed, in operation 420, the system sends an instruction that no action is to be taken. Based on a data traffic issue being observed, in operation 406, the system logs into the cluster. In operation 408, the system validates the UP traffic. In operation 410, the system sends an instruction (e.g., to the VCU) to reset the UP. In operation 412, the system observes data traffic flow in the reset UP. The system may directly observe the UP or receive a further notification from, for example, the VCU that includes the data traffic flow. In operation 414, the system determines whether the data traffic flow is normal. If the system determines that the data traffic flow is not normal, then the system may repeat operations 408, 410, 412 and 414. Based on the system determining that the data traffic flow is normal, in operation 416, the system ends the recovery process.

FIG. 5 is a flowchart 500 for a method of monitoring a UP, according to an embodiment. In operation 502, the system monitors data traffic on a first UP. In operation 504, the system detects a data traffic inconsistency on the first UP. In operation 506, the system provides a notification on the data traffic inconsistency to an external device based on detecting the data traffic inconsistency. In operation 508, the system resumes monitoring the data traffic on the first UP based on an indication from the external device that the data traffic inconsistency is resolved.

Figure 6:
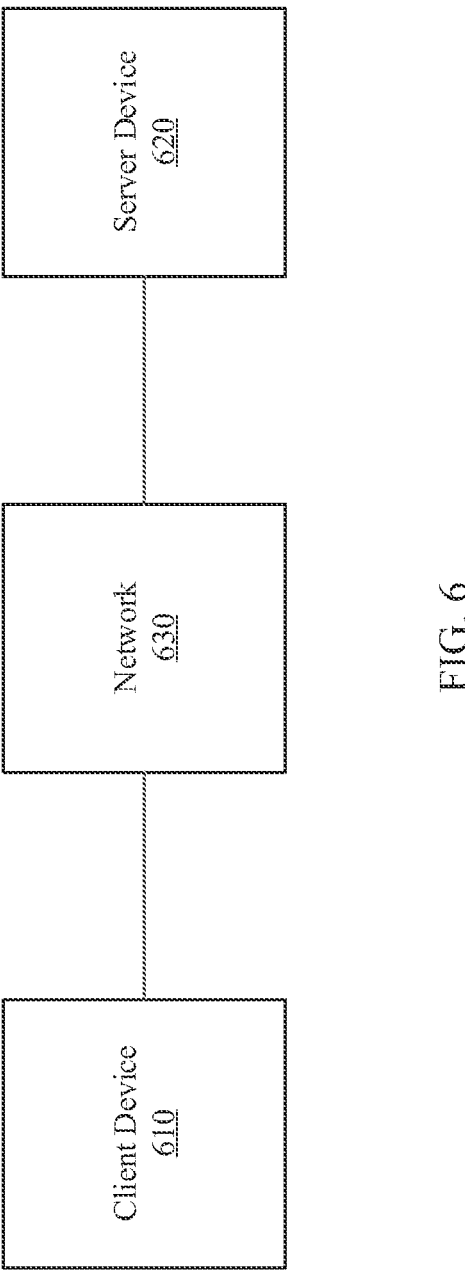
FIG. 6 is a diagram of devices of a system according to an embodiment.

FIG. 6 is a diagram of a system according to an embodiment. Referring to FIG. 6, the system includes a user device 610, a server device 620, and a network 630. The user device 610 and the server device 620 may interconnect via wired connections, wireless connections, or a combination of wired and wireless connections.

The user device 610 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device. The user device 610 may correspond to a UE in a mobile communication system or the external device described above.

The server device 620 includes one or more devices. For example, the server device 620 may be a server device, a computing device, or the like. The server device 620 may include at least one of the VDU 204 or the VCU 206 described above.

The network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) may perform one or more functions described as being performed by another set of devices.

Figure 7:
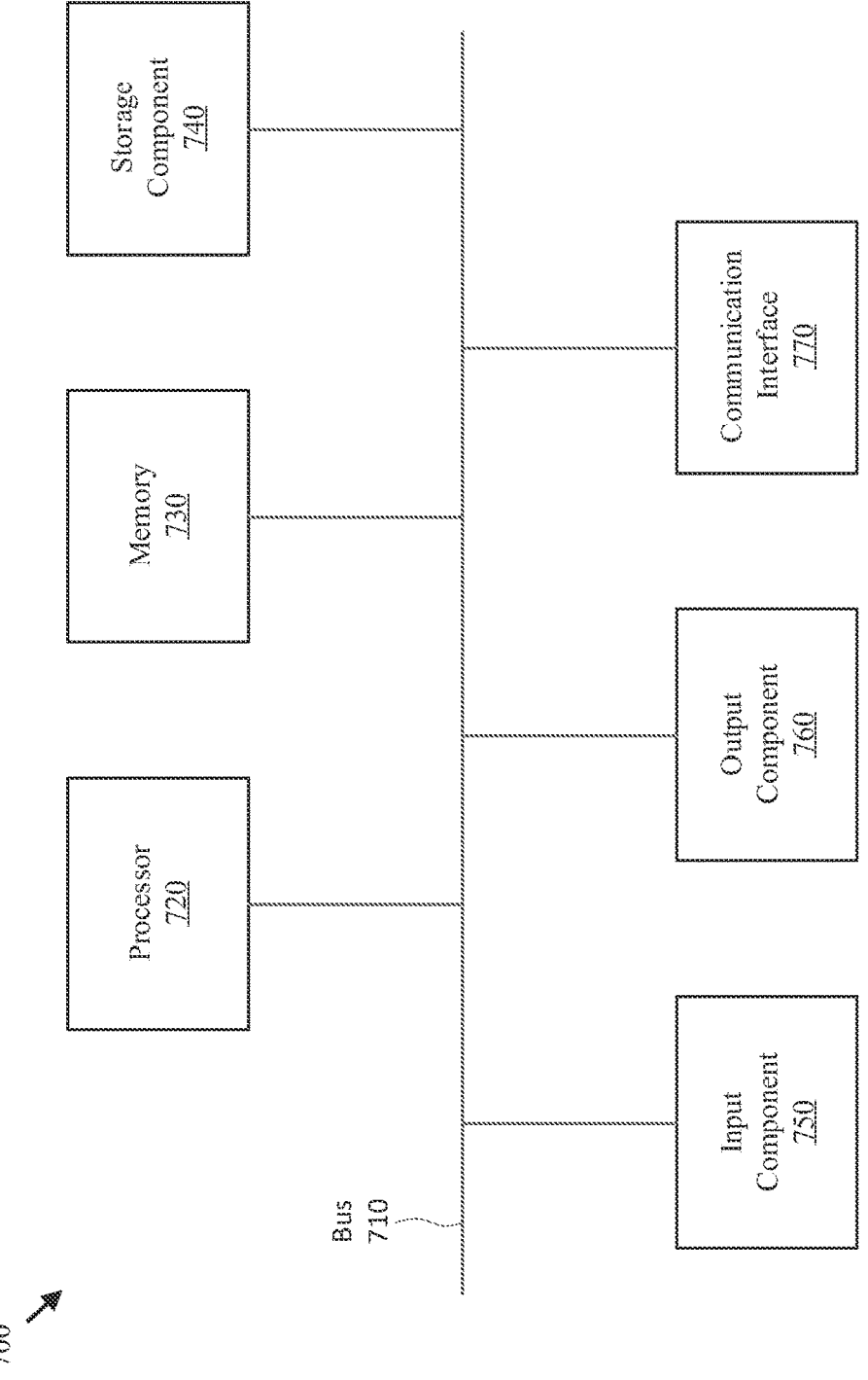
FIG. 7 is a diagram of components of the devices of FIG. 6 according to an embodiment.

FIG. 7 is a diagram of components of one or more devices of FIG. 6 according to an embodiment. Device 700 may correspond to the user device 610 and/or the server device 620.

As shown in FIG. 7, the device 700 may include a bus 710, a processor 720, a memory 730, a storage component 740, an input component 750, an output component 760, and a communication interface 770.

The bus 710 includes a component that permits communication among the components of the device 700. The processor 720 is implemented in hardware, firmware, or a combination of hardware and software. The processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 720 includes one or more processors capable of being programmed to perform a function.

The memory 730 includes a random access memory (RAM), a read only memory (ROM), and/or another type of dynamic or static storage device (e.g., a flash memory, a magnetic memory, and/or an optical memory) that stores information and/or instructions for use by the processor 720.

The storage component 740 stores information and/or software related to the operation and use of the device 700. For example, the storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 750 includes a component that permits the device 700 to receive information, such as via user input (e.g., a touch screen display, a keyboard, a keypad, a mouse, a button, a switch, and/or a microphone). The input component 750 may include a sensor for sensing information (e.g., a global positioning system (GPS) component, an accelerometer, a gyroscope, and/or an actuator).

The output component 760 includes a component that provides output information from the device 700 (e.g., a display, a speaker, and/or one or more light-emitting diodes (LEDs)).

The communication interface 770 includes a transceiver-like component (e.g., a transceiver and/or a separate receiver and transmitter) that enables the device 700 to communicate with other devices, such as via a wired connection, a wireless connection, or a combination of wired and wireless connections. The communication interface 770 may permit device 700 to receive information from another device and/or provide information to another device. For example, the communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

The device 700 may perform one or more processes described herein. The device 700 may perform operations based on the processor 720 executing software instructions stored by a non-transitory computer-readable medium, such as the memory 730 and/or the storage component 740. A computer-readable medium is defined herein as a non-transitory memory device. A memory device includes memory space within a single physical storage device or memory space spread across multiple physical storage devices.

Software instructions may be read into the memory 730 and/or the storage component 740 from another computer-readable medium or from another device via the communication interface 770. When executed, software instructions stored in the memory 730 and/or storage component 740 may cause the processor 720 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
monitoring, by a virtualized central unit (VCU), data traffic on a first user plane, from among a first user plane and a second user plane between the VCU of a Radio Access Network (RAN) and a virtual distributed unit (VDU) of the RAN;
detecting, by the VCU, a data traffic inconsistency on the first user plane; and
providing, by the VCU, a notification of the data traffic inconsistency to an external device based on the detecting the data traffic inconsistency;

wherein the VCU resumes monitoring data traffic on the first user plane based on an indication from the external device that the data traffic inconsistency is resolved.

2. The method of claim 1, further comprising selecting, by the VCU, from among the first user plane and a second user plane, the first user plane to monitor based on comparing a traffic amount of the first user plane to a traffic amount of the second user plane, and determining that the first user plane has less traffic than the second user plane.

3. The method of claim 1, wherein the detecting the data traffic inconsistency comprises:
determining, by the VCU, an amount of data traffic on the first user plane; and
determining, by the VCU, an amount of user traffic on the first user plane.

4. The method of claim 3, wherein the VCU detects the data traffic inconsistency based on a ratio of the amount of data traffic to the amount of user traffic being greater than a predetermined data traffic threshold.

5. The method of claim 1, wherein the monitoring data traffic on the first user plane is performed at predetermined time intervals.

6. The method of claim 1, wherein the notification of the data traffic inconsistency comprises information on an average data volume for a predetermined time interval on the first user plane and information on an average data volume for the predetermined time interval on a second user plane.

7. The method of claim 1, further comprising:
resetting, by the VCU, the first user plane based on an instruction to reset the first user plane received from the external device,
wherein the instruction to reset the first user plane is generated in response to observing a data traffic issue on the first user plane based on information included in the notification of the data traffic inconsistency.

8. A system, comprising:
a memory storing instructions; and
a processor configured to execute the instructions to:
monitor, by a virtualized central unit (VCU), data traffic on a first user plane, from among a first user plane and a second user plane between the VCU of a Radio Access Network (RAN) and a virtual distributed unit (VDU) of the RAN;
detect, by the VCU, a data traffic inconsistency on the first user plane; and
provide, by the VCU, a notification of the data traffic inconsistency to an external device based on the detecting the data traffic inconsistency;
wherein the VCU resumes monitoring data traffic on the first user plane based on an indication from the external device that the data traffic inconsistency is resolved.

9. The system of claim 8, wherein the processor is further configured to execute the instructions to select, by the VCU, from among the first user plane and a second user plane, the first user plane to monitor based on comparing a traffic amount of the first user plane to a traffic amount of the second user plane, and determining that the first user plane has less traffic than the second user plane.

10. The system of claim 8, wherein the processor is further configured to execute the instructions to detect the data traffic inconsistency by:
determining, by the VCU, an amount of data traffic on the first user plane; and
determining, by the VCU, an amount of user traffic on the first user plane.

11. The system of claim 10, wherein the VCU detects the data traffic inconsistency based on a ratio of the amount of data traffic to the amount of user traffic being greater than a predetermined data traffic threshold.

12. The system of claim 8, wherein the processor is further configured to execute the instructions to monitor the data traffic on the first user plane at predetermined time intervals.

13. The system of claim 8, wherein the notification of the data traffic inconsistency comprises information on an average data volume for a predetermined time interval on the first user plane and information on an average data volume for the predetermined time interval on a second user plane.

14. The system of claim 8, wherein processor is further configured to execute the instructions to:

reset, by the VCU, the first user plane based on an instruction to reset the first user plane received from the external device, wherein the instruction to reset the first user plane is generated in response to observing a data traffic issue on the first user plane based on information included in the notification of the data traffic inconsistency.

15. A non-transitory computer-readable storage medium storing instructions that, when executed by one or more processors, cause the one or more processors to:

monitor, by a virtualized central unit (VCU), data traffic on a first user plane, from among a first user plane and a second user plane between the VCU of a Radio Access Network (RAN) and a virtual distributed unit (VDU) of the RAN;

detect, by the VCU, a data traffic inconsistency on the first user plane; and provide, by the VCU, a notification of the data traffic inconsistency to an external device based on the detecting the data traffic inconsistency;

wherein the VCU resumes monitoring data traffic on the first user plane based on an indication from the external device that the data traffic inconsistency is resolved.

16. The storage medium of claim 15, wherein the instructions, when executed, further cause the one or more processors to select, by the VCU, from among the first user plane and a second user plane, the first user plane to monitor based on comparing a traffic amount of the first user plane to a traffic amount of the second user plane, and determining that the first user plane has less traffic than the second user plane.

17. The storage medium of claim 15, wherein the instructions, when executed, further cause the one or more processors to detect the data traffic inconsistency by:

determining, by the VCU, an amount of data traffic on the first user plane; and determining, by the VCU, an amount of user traffic on the first user plane.

18. The storage medium of claim 17, wherein the VCU detects the data traffic inconsistency based on a ratio of the amount of data traffic to the amount of user traffic being greater than a predetermined data traffic threshold.

19. The storage medium of claim 15, wherein the instructions, when executed, further cause the one or more processors to monitor the data traffic on the first user plane at predetermined time intervals.

20. The storage medium of claim 15, wherein the notification of the data traffic inconsistency comprises information on an average data volume for a predetermined time interval on the first user plane and information on an average data volume for the predetermined time interval on a second user plane.

* * * * *